(12) United States Patent
Tuncer et al.

(10) Patent No.: US 9,707,972 B2
(45) Date of Patent: Jul. 18, 2017

(54) OPERATOR ASSISTANCE SYSTEM FOR AN AGRICULTURAL MACHINE

(71) Applicant: Deere & Company, Moline, IL (US)

(72) Inventors: Zeynep Tuncer, Wadgassen (DE); Georg Kormann, Zweibruecken (DE); Patrick E Pinkston, Leclaire, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/792,819

(22) Filed: Jul. 7, 2015

(65) Prior Publication Data

US 2016/0052525 A1 Feb. 25, 2016

(30) Foreign Application Priority Data

Aug. 21, 2014 (DE) .................. 10 2014 216 593

(51) Int. Cl.
*G06F 7/70* (2006.01)
*G06F 19/00* (2011.01)
(Continued)

(52) U.S. Cl.
CPC ......... *B60W 50/085* (2013.01); *A01D 41/127* (2013.01); *B60W 10/06* (2013.01); *B60W 10/30* (2013.01); *B60W 50/0098* (2013.01); *B60W 2300/158* (2013.01); *B60W 2710/0644* (2013.01); *B60W 2710/30* (2013.01); *B60W 2900/00* (2013.01)

(58) Field of Classification Search
CPC .................................................. B60W 50/85
See application file for complete search history.

(56) References Cited

U.S. PATENT DOCUMENTS

2008/0059035 A1* 3/2008 Siddiqui ............... B60K 6/445
701/93
2010/0152927 A1* 6/2010 Sacle .................. G05D 1/0005
701/3
(Continued)

FOREIGN PATENT DOCUMENTS

DE 102009009767 A1 8/2010
DE 102012021469 A1 5/2014
(Continued)

OTHER PUBLICATIONS

MDA 120. Product Brochure. Aclantec GmbH, 1995. 14 pages. [Retrieved Aug. 2014].
(Continued)

*Primary Examiner* — Imran Mustafa

(57) ABSTRACT

An operator assistance system for an agricultural machine which has at least one variable operating parameter which influences a plurality of different result parameters of the working result of the machine is equipped with an input device, a processor and a display device. The processor is programmed to receive, via the input device an input of a selectable result parameter, to be optimized, of the working result for an operation to be carried out, to calculate an optimized operating parameter on the basis of the input, and to output, on the display device, an expected value, associated with the optimized operating parameter, for the working result of the machine for the operation.

20 Claims, 3 Drawing Sheets

(51) Int. Cl.
*G06G 7/00* (2006.01)
*G06G 7/76* (2006.01)
*B60W 50/08* (2012.01)
*A01D 41/127* (2006.01)
*B60W 10/06* (2006.01)
*B60W 10/30* (2006.01)
*B60W 50/00* (2006.01)

(56) References Cited

U.S. PATENT DOCUMENTS

| | | | |
|---|---|---|---|
| 2014/0019018 A1* | 1/2014 | Baumgarten | A01D 41/127 |
| | | | 701/50 |
| 2014/0156152 A1* | 6/2014 | Faivre | G05D 1/00 |
| | | | 701/50 |

FOREIGN PATENT DOCUMENTS

| | | | |
|---|---|---|---|
| EP | 0586999 | A2 | 3/1994 |
| EP | 0928554 | A1 | 7/1999 |
| EP | 2042019 | A2 | 4/2009 |
| EP | 2132974 | A1 | 12/2009 |

OTHER PUBLICATIONS

German Search Report issued in counterpart application No. 10 2014 216 593.8, dated Aug. 7, 2015 (8 pages).

\* cited by examiner

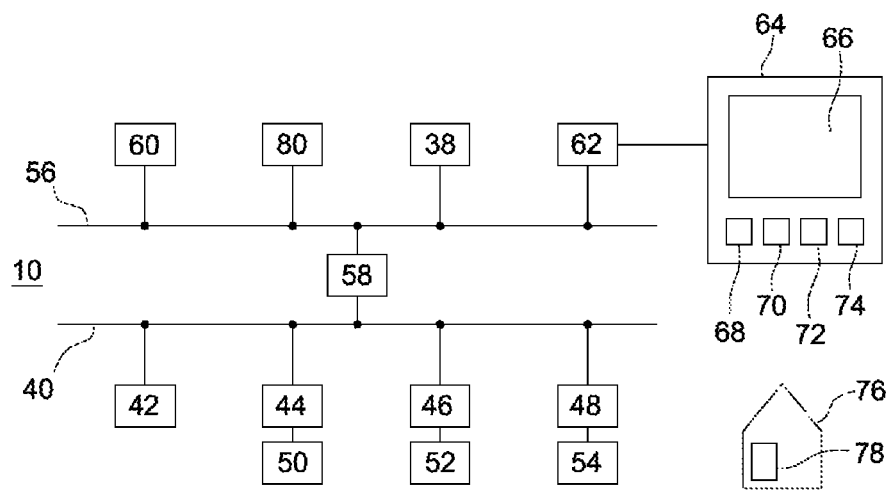
FIG. 2
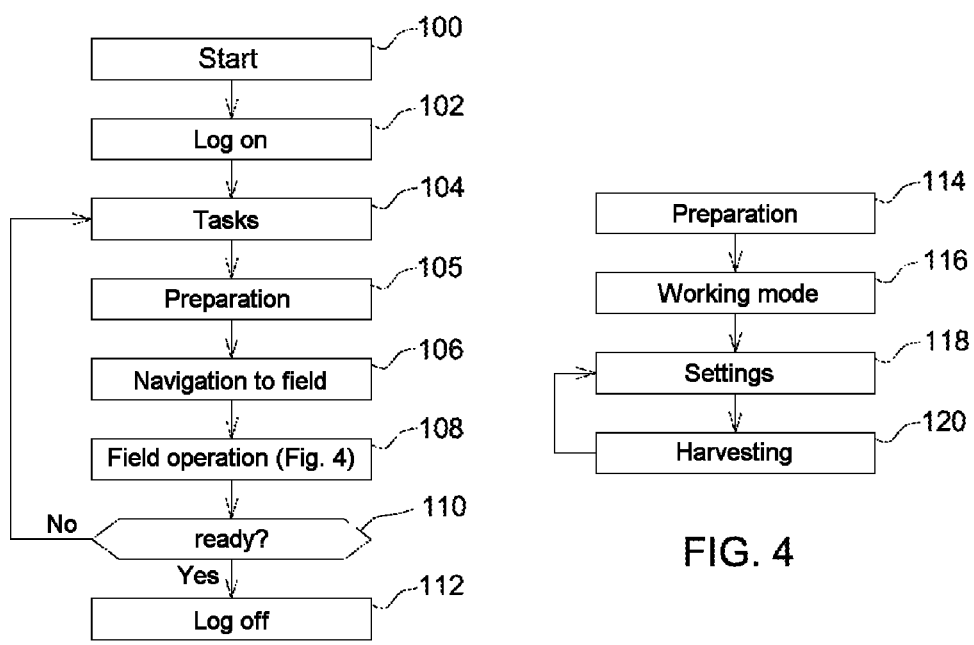
FIG. 3
FIG. 4

OPERATOR ASSISTANCE SYSTEM FOR AN AGRICULTURAL MACHINE

CROSS-REFERENCE TO RELATED APPLICATIONS

Pursuant to 35 USC §119, this application claims the benefit of and priority to German patent application no. 102014216593.8, filed on Aug. 21, 2014, which is herein incorporated by reference in its entirety.

FIELD OF THE DISCLOSURE

The invention relates to an operator assistance system for an agricultural machine which has at least one variable operating parameter which influences a plurality of different result parameters of the working result of the machine.

BACKGROUND

Agricultural machines such as tractors, combine harvesters and field choppers comprise a relatively large number of actuators for setting operating parameters, which actuators have to be placed in a suitable position in order to achieve a satisfactory harvesting result with appropriate application of resources. These operating parameters include in harvesting machines, for example, the rotational speed of the internal combustion engine, the propulsion speed (which defines the harvested crop throughput rate) as well as operating parameters of harvested crop-processing devices such as, in the case of a field chopper, the cutting height of the harvesting attachment, the feed speed in the intake duct, the number of chopper blades of a chopper drum and the distance between two rollers of a harvested crop post-processing device. In the case of a combine harvester, the threshing parameters and cleaning parameters have to be set. In tractors it is also necessary to make various settings and predefinitions, such as the predefinition of a propulsion speed and penetration depth of a soil working tool when working in soil.

Since, in particular, inexperienced operators such as often used as seasonal workers for harvesting generally experience great difficulty in setting the operating parameters to suitable values, especially since they mainly have to carry out other tasks during harvesting, such as steering, monitoring a transfer process, etc., in the past various systems have been proposed which propose suitable operating parameters to the operator so that the operator can set them or which automatically set the operating parameter. In this respect, reference is made, for example, to the prior art according to EP 0 928 554 A1 which describes a combine harvester with a driver assistance system which, after information about external harvesting conditions has been input, permits a selection of different target predefinitions on the basis of which ultimately proposals for operating parameters are provided. The target predefinitions are, in particular, the area output (throughput rate) and the losses which occur, wherein a weighting of both target predefinitions can also be performed on the basis of a two-dimensional curve in which the losses are plotted as a function of the throughput rate.

EP 2 042 019 A2 describes a driver assistance system which permits the operator to propose a change in an operating parameter of a combine harvesters and then displays an expected tendency for the working result.

EP 0 586 999 A2 presents another driver assistance system in which the operator can input operating parameters of a combine harvester and the weighting of target predefinitions, and the system then outputs expected working results.

In another system "Harvester assistant MDA 120" from Aclantec GmbH from 1995, the operator can select, for the purpose of calculating harvesting processes in advance, whether he predefines a loss or urgency of the harvesting. The system then outputs the respective throughput capacity or the speed for the harvesting process.

EP 2 132 974 A1 describes a field chopper in which the operator can input a target predefinition with respect to the compressibility of the harvested crop which is to be achieved. The operator assistance system checks, on the basis of the cutting length and the moisture of the harvested crop, whether the target predefinition can be achieved, and said operator assistance system displays other suitable operating parameters of the field chopper if the target predefinition does not appear to be achievable.

In the prior art according to EP 0 928 554 A1 there is therefore the possibility of selecting a result parameter (throughput rate and/or losses) which is to be optimized of the working result for an operation which is to be carried out. The operator assistance system then outputs the operating parameter (threshing unit and cleaning setting) to be set, but does not display to the operator which result parameter is actually being achieved. The inexperienced operator is presented here with the difficulty of selecting the result parameter which is to be optimized.

The operator assistance systems according to EP 2 042 019 A2 and EP 0 586 999 A2 leave it to the operator to input different settings of the operating parameter and display an expected tendency or an expected result. The optimization of the operating parameter is therefore not carried out automatically in these operator assistance systems by the operator assistance system but rather by the operator who has to try out a plurality of settings in order to find the optimum setting, which will not always lead to optimum settings.

The operator assistance system according to MDA 120 merely permits the value of the result parameter to be achieved (loss or working speed) to be input and outputs the operating parameters to be set for the combine harvester. Here, the operator must therefore input the value of the optimum result parameter himself, which exceeds the abilities of inexperienced operators.

Finally, EP 2 132 974 A1 knows only a single result parameter, that is specifically the compressibility of the harvested crop. However, many harvesting tasks in which it would be advantageous to optimize other result parameters are conceivable.

The present invention has the object of developing an operator assistance system for a field chopper which is further developed compared to the prior art and in which the abovementioned disadvantages do not occur, or occur to a reduced degree.

SUMMARY

The present invention is defined by the patent claims.

An operator assistance system for an agricultural machine which has at least one variable operating parameter which influences a plurality of different result parameters of the working result of the machine is equipped with an input device, a processor connected to the input device and a display device connected to the processor. The processor is programmed to receive, via the input device an input of a selectable result parameter, to be optimized, of the working result for an operation to be carried out, to calculate an optimized operating parameter on the basis of the input, and to output, on the display device, an expected value, associated with the optimized operating parameter, for the working result of the machine for the operation.

In other words, the operator can use the input device to select which result parameter is to be optimized from a plurality of different result parameters of the working result of the agricultural machine for an operation which is to be carried out. The processor of the operator assistance system then calculates, as a function of the selected result parameter, an optimized operating parameter and an expected value, associated with the optimized operating parameter, for the working result of the machine for the operation, and displays this value on the display device.

In this way, the operator is provided with the possibility of having different result parameters optimized in a virtual way before the start of the work or during the work, and to have the associated, expected values for the working result of the machine for the operation displayed on the display device. The operator can then discern which type of optimization has which effects on the value for the working result. As a result, an inexperienced operator can also easily select the most suitable type of optimization for the operation and arrive at an optimum operating parameter of the machine. This operating parameter can finally be set actually on the machine by the operator or directly by the operator assistance system.

In particular, the input device can permit an input of one or more or of all the following result parameters: (a) maximum efficiency of the operation, (b) maximum productivity of the operation and (c) maximum quality of the working result. In the case of the quality of the working result a possibility of inputting by the operator can be provided in order to define in a more detailed way what an optimum quality should look like. In the case of a field chopper with a harvested crop post-processing device (grain processor), it is possible to input, for example, whether the grains are only to be beaten or to be ground.

It is possible to display one or more or all of the following values for the working result of the machine for the operation on the display device: throughput rate of harvested crop, fuel consumption, working time and a measure of the quality of the harvested crop.

The input device preferably permits a selection of a relative weighting of the possible result parameters. In this context, the processor can be programmed to calculate, for a selected result parameter which comprises a plurality of the possible result parameters in a weighted measure, the operating parameter as a function of the relative weighting of the respective result parameters in that it permits greater deviations from an operating parameter which results in the case of a pure selection of a single result parameter, the smaller the weighting of the respective result parameter.

The processor is, in particular, programmed to display a graphic representation on the display device, in which representation different result parameters are assigned to defined points of a geometric body (in the case of three selectable result parameters, for example corners of a triangle), and a cursor serving to select the result parameter can be moved over the geometric body with the input device. The cursor can be moved by means of separate elements of the input device, for example pushbutton keys or a mouse or a ball, or the display device is embodied in a touch-sensitive fashion and then serves simultaneously as an input device.

The machine is, in particular, a field chopper which has an internal combustion engine, a harvesting attachment which has a drive connection to the internal combustion engine, a harvested crop feed device which is arranged downstream of the harvested crop collecting device, has a drive connection to the internal combustion engine and has pre-pressing rollers, a chopper device which is arranged downstream of the harvested crop feed device and has a drive connection to the internal combustion engine, a harvested crop post-processing device which is arranged downstream of the chopper device and has a drive connection to the internal combustion engine, and a transfer device, arranged downstream of the harvested crop post-processing device, for chopped harvested crop. The processor is programmed in this case to optimize one or more or all of the following operating parameters: the rotational speed of the internal combustion engine, the propulsion speed of the field chopper, the cutting length of the harvested crop and a degree of action (which influences the opening—"cracking"—of the grains in the harvested crop) of the harvested crop post-processing device.

The processor can be supplied with information relating to one or more or all of the following variables and can be programmed to take into account the variables during the optimization of the operating parameter and of the expected value for the working result: moisture content of harvested material to be collected, crop density of a field which is to be harvested and has a crop, type of plants of the field to be harvested, intended use of the crop, type of harvesting attachment, number of blades of a chopper drum, cutting height of the harvesting attachment, a predefinable lower and/or upper limit of the cutting length, weather history and any types of linear or non-linear relationships, which are theoretical or based on empirical values between the aforementioned variables and the resulting operating parameter and/or the expected value for the working result.

The operator assistance system can be implemented physically on a portable hand-held device which can be disconnected from the machine and connected to a bus system of the machine. However, it is also conceivable to implement the operator assistance system as an on-board computer of the machine.

BRIEF DESCRIPTION OF THE DRAWINGS

An exemplary embodiment of the invention which is described in more detail below is illustrated in the drawings, wherein the reference symbols must not be used to make a limiting interpretation of the patent claims. In the drawings:

FIG. 2 shows a schematic illustration of an operator assistance system and of its connection to a communication system of the machine, FIG. 3 shows a flowchart, according to which the operator assistance system proceeds during the processing of a work order, FIG. 4 shows a flowchart according to which the operator assistance system proceeds during field mode.

DETAILED DESCRIPTION

Figure 1:
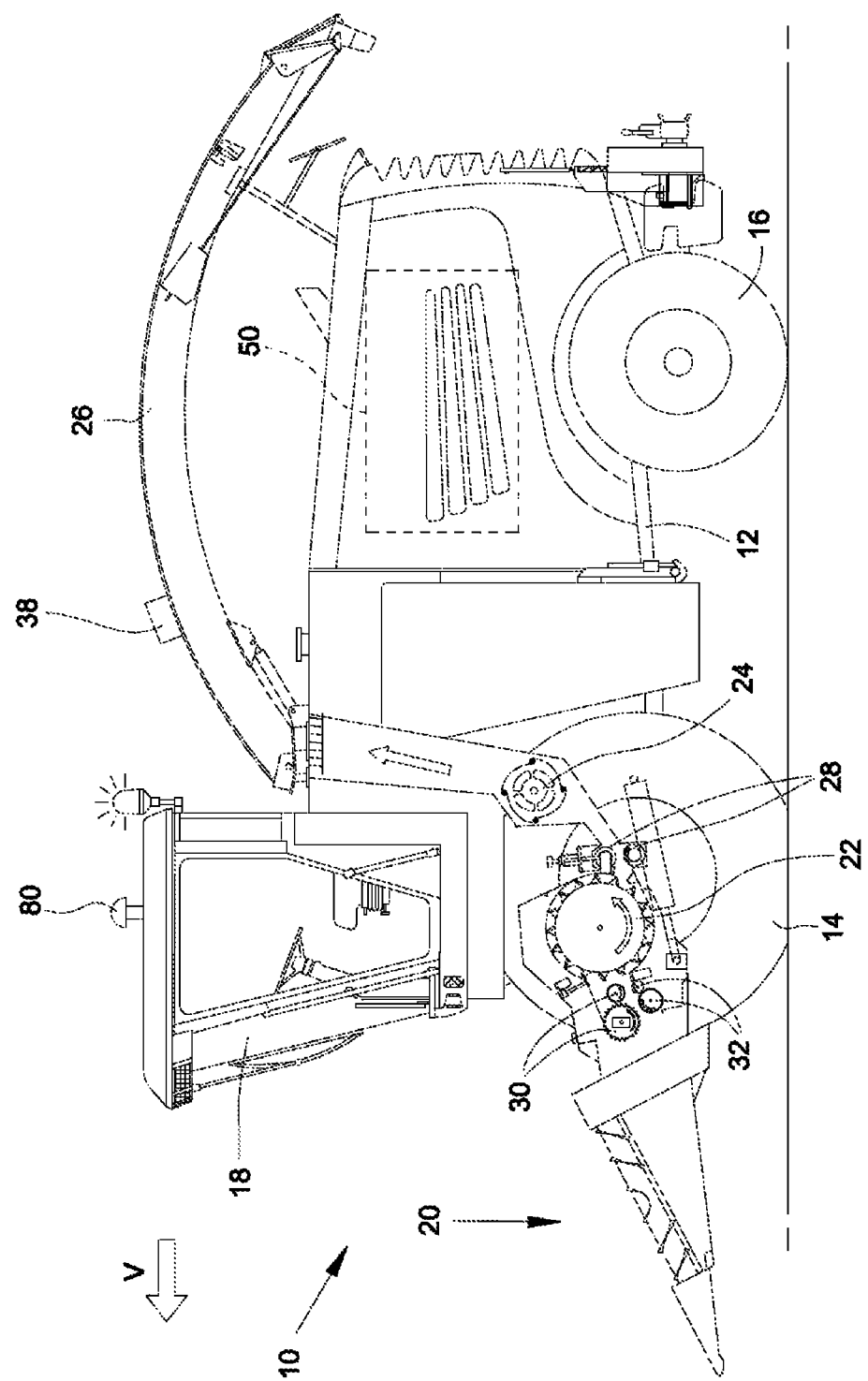
FIG. 1 shows a schematic side view of a machine in the form of a self-propelling field chopper.

FIG. 1 illustrates a self-propelling agricultural machine 10 of the type of a self-propelling field chopper in a schematic side view. The machine 10 is built on a frame 12 which is supported by front driven wheels 14 and steerable rear wheels 16. The operator control of the machine 10 is carried out from a drivers cab 18, from which a harvesting attachment 20 in the form of a rotary crop header for maize plants can be seen. Harvested crop, for example maize or the like, which is collected from the ground by means of the harvesting attachment 20 is fed via an input feeder with pre-pressing rollers 30, 32, arranged within an input housing on the front side of the machine 10, to a chopper device 22, in the form of a chopper drum, which is arranged underneath the drivers cab 18 and chops said harvested crop into small pieces, and, after it has passed through a harvested crop post-processing device 28 with cooperating processor rollers, passes it to a feed device 24. The material leaves the harvesting machine 10 and passes to a transportation vehicle travelling alongside, by means of a transfer device 26 which can be rotated about an approximately vertical axis and has an adjustable inclination. A sensor 38 for sensing harvested crop properties 38, in particular the moisture of the harvested crop, is mounted on the transfer device 26.

An internal combustion engine 50 drives the chopper device 22, the harvested crop post-processing device 28 and the feed device 24 via a mechanical drive train. Furthermore, said internal combustion engine 50 drives hydraulic pumps (not shown) which in turn supply hydraulic motors 52, 54 for driving the harvesting attachment 20 and the pre-pressing rollers 30, 32. Reference is made in this respect to the disclosure in DE 10 2009 003 242 A1.

Directional information such as at the front, at the rear, on the side, at the bottom and at the top relate below to the forward direction V of the machine 10 which runs to the left in FIG. 1.

Reference will now be made to FIG. 2. The machine 10 comprises a first (machine) bus 40 which serves to transmit parameters which are relevant for controlling the machine 10 and can be embodied, for example, as a CAN bus. A control unit 42, which serves to control control units 44, 46, 48, is connected to this bus system. The control unit 44 controls, for example, operating data of the internal combustion engine 50, such as the fuel supply and therefore the rotational speed of the internal combustion engine 50, which serves to drive the machine 10. The control unit 46 controls operating data of a hydraulic motor 52, which serves to drive the harvesting attachment 20, while the control unit 48 controls operating data of a hydraulic motor 54 which serves to drive the pre-pressing rollers 30, 32. The control unit 42 accordingly controls, inter alia, the rotational speeds of the internal combustion engine 50 and of the hydraulic motors 52 and 54.

The machine 10 also comprises a second (communication) bus 56 which operates, in particular, according to the Standard ISO 11783. It serves, inter alia, to transmit position data and harvested crop data because the sensor 38, a position-determining system 80 for acquiring signals from satellites of a navigation system (GPS, Galileo or Glonass) and a virtual terminal 60 are connected to it. A first communication interface 58 connects the second bus 56 to the first bus 40. A second communication interface 62 connects the second bus 56 to an operator assistance system 64 which is embodied as a separate, portable device and which can be embodied as what is referred to as a tablet computer or smartphone and comprises a processor 68, a memory device 70, in which programs and data for the processor 68 are stored, a display device 66, an input device 72 and a wireless, third communication interface 74 which serves for wireless communication with a computer 78 which is arranged at a remote point 76. The third communication interface 74 can operate according to any desired protocol, in particular for mobile telephony (for example GSM) or data transmission (for example UMTS or LTE or WLAN) and can use intermediately connected relay stations to carry out, in particular Internet-protocol-based communication with the computer 78. The second communication interface 62 can interact with the operator assistance system 64 via a wire-bound protocol (for example Ethernet) via a line or in a wireless fashion (for example WLAN or Bluetooth). The operator assistance system 64 can be arranged in a holder in the cab 18 which serves as a docking station and supplies the operator assistance system 64 with current and connects it to the second communication interface 62.

FIG. 3 shows a flowchart according to which the processor 68 of the operator assistance system 64 proceeds when the latter is used for processing harvesting orders. After the start in step 100, an operator can log onto the operator assistance system 64 in step 102, in particular after inputting an identity reference and a password. In the following step 104 the operator can have the orders lined up for the respective day (and if appropriate following days) displayed to him on the display device 66, which orders the operator assistance system 64 receives from the computer 78 via the third communication interface 74. The computer 78 can be located, for example, in the office of a contractor and can be supplied with the orders by said contractor, or the orders are input by clients (for example farmers) into an Internet-based system which runs on the computer 78.

If the operator then wishes to carry out an order, he causes the operator assistance system 64 to go to the step 105 by means of a suitable input into the input device 72. In this context, preparations for the harvesting are made, for example, the machine is refueled, if appropriate cleaned, and a harvesting attachment 20 which is suitable for the order is hitched. Grinding processes for sharpening the chopper blades of the chopper device 22 and/or setting the counter blade distance can also be carried out. For this purpose, corresponding instructions can be issued to the operator on the display device 66, which operator then carries out the necessary steps himself even though those steps which do not require any manual action by the operator, such as the grinding process or the counter blade setting, can also be brought about by the operator assistance system 64, which then correspondingly activates the control unit 42.

In the following step 106, the operator is navigated to the field to be harvested in that, for example, a map is displayed on the display device 66 according to which the operator drives the machine 10 to the field. The position data can be made available here by the position-determining system 80 via the second communication interface 62, or by an internal position-determining system of the operator assistance system 64.

After the arrival at the field, the operator can cause the operator assistance system 64 to go to the step 108, i.e. to commence the field operation, by means of a suitable input into the operator input device 72. This step 108 is explained further below on the basis of FIG. 4. The end of the field operation (step 108) is followed by the step 110 in which the operator can input that his orders for the day are ended, after which the logging off takes place in step 112. Otherwise, the step 104 follows again.

In steps 102, 104, 105, 106, 108, 110 and 112, different contents, corresponding to the respective step, are respectively displayed to the operator on the display device 66.

The step 108 is now described in detail on the basis of FIG. 4. Firstly, the step 114 is carried out in which preparations for the harvesting work are carried out. In this context, the operator assistance system 64 can display on the display device 66 necessary measures which the operator is to carry out. Furthermore, transport protection devices are to be removed from the harvesting attachment 20 and the (multi-part) harvesting attachment 20 is to be pivoted into a harvesting position.

In step 116, a working mode of the machine is then selected. In response to corresponding instructions on the display device 66 of the operator assistance system 64, the operator can for this purpose switch over to field mode a safety switch which serves to switch over between road mode and field mode, and the operator can then close a clutch in the drive train between the internal combustion engine 50 on the one hand, and the chopper device 22, the feed device 24 and the harvested crop post-processing device 28, on the other, in order to set the chopper device 22 in motion. The machine 10 is then ready for harvesting, and this is the case because the hydraulic motors 52, 54 are also rotating.

Figure 5:
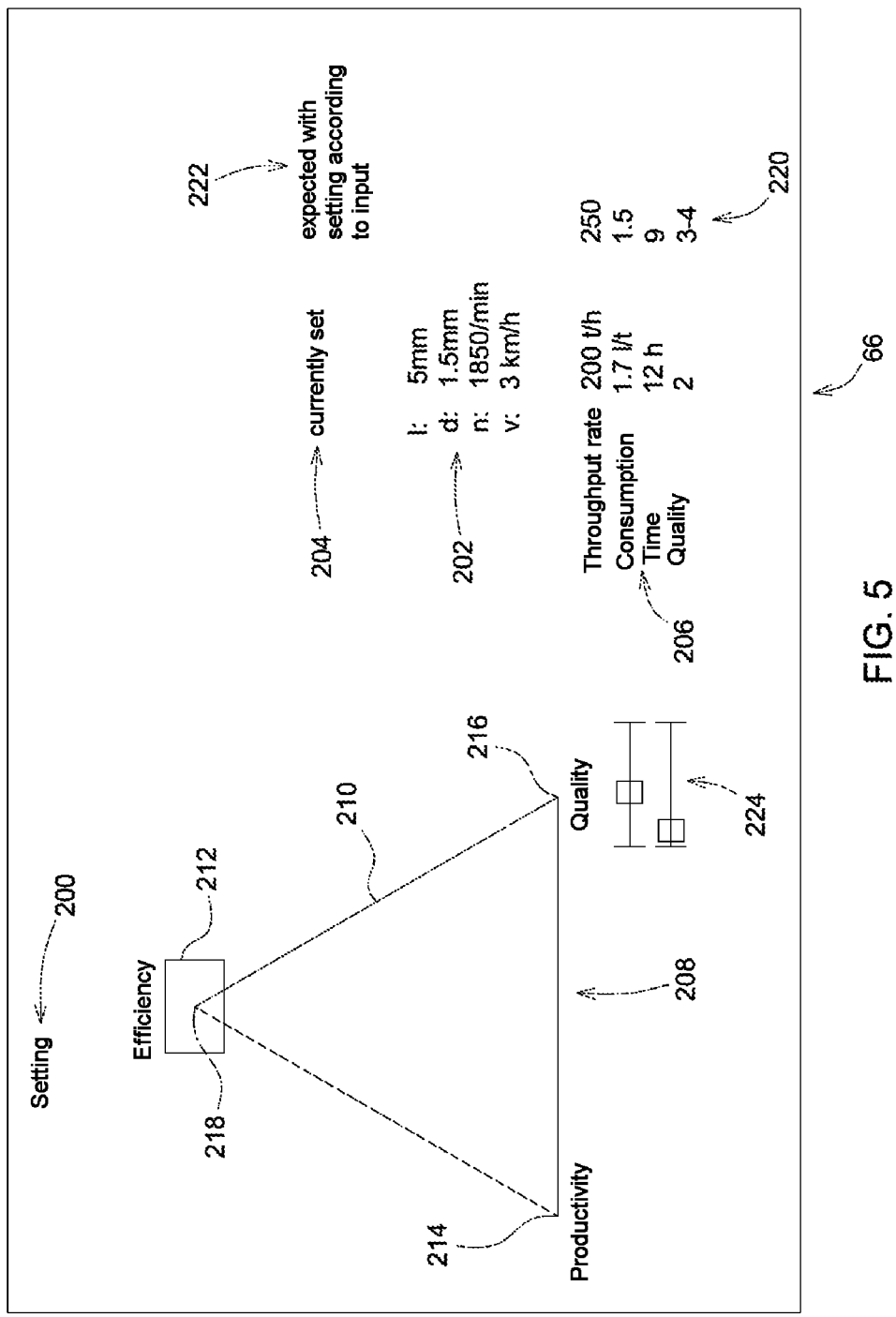
FIG. 5 shows an example of an image which is displayed by the display device of the operator assistance system during the optimization of the operating parameters of the machine.

In the following step 118, a number of settings of the machine 10 are defined in order to permit optimum operation. The step 118 could also be carried out before the step 114 or 116 and can also be repeated during the harvesting which follows in step 120. During the execution of the step 118, the image which is displayed in FIG. 5 is displayed on the display device 66.

The display device 66 displays that currently a setting of the machine 10 is to be optimized (field 200). Furthermore, in a field 202 respectively currently set operating parameters of the machine 10 are displayed, specifically the cutting length l, which is 5 mm, the distance d between the process rollers of the harvested crop post-processing device 28, which is 1.5 mm, the rotational speed of the internal combustion engine 50, which is 1850/min, and the preselected propulsion speed v, which is 3 km/h. A text 204 which is arranged above the latter clarifies that the settings are the currently selected ones.

In a further field 206, values for the working result of the machine 10 for the operation, which are expected given the currently selected settings, are displayed. Here, the throughput rate, which is 200 t/h, the fuel consumption of 1.7 l/t harvested crop, the expected harvesting time of 12 hours and a gradation of the quality of the harvested crop, which is displayed here as a mark of 2, are displayed.

In a further field 208, a geometric body 210 in the form of a triangle is displayed in which defined points, which are here the corners, are assigned different optimizable result parameters of the working process. The productivity is assigned to a (left-hand lower) corner 214 of the body 210, the quality is assigned to a (right-hand lower) corner 216 of the body 210, and the efficiency is assigned to a (middle upper) corner 218. A cursor 212 can be moved over the body 210 by means of the input device 72, which can also be embodied as a touch-sensitive display device 66. If the cursor 212 is in the displayed position, the processor 68 will optimize the efficiency of the operation, i.e. find operating parameters at which the harvesting process is carried out with minimum fuel consumption. If the operator moves the cursor 212 into the corner 214 which is assigned to the productivity, the processor 68 will optimize the productivity of the operation, i.e. find operating parameters at which the harvesting process is carried out with minimum time and the highest possible throughput rate. If the operator moves the cursor 212 into the corner 216 which is assigned to the quality, the processor 68 will optimize the quality of the working result, i.e. find operating parameters at which the harvesting process is carried out with the best possible result in terms of harvesting quality. The cursor 212 can also be moved into any desired intermediate position, for example in the centre of the triangle, at which a compromise is sought between the three abovementioned result parameters. The cursor 212 can also be placed at a position at the edge of the triangle with the result that a compromise is then determined between two result parameters. The nearer the cursor is positioned to one of the corners 214, 216, 218, the higher the weighting with which the associated result parameter is included in the selection of the operating parameters.

In a further field 220, the display device 66 displays which values are to be expected for the working result of the machine 10 for the operation if operating parameters calculated according to the current position of the cursor were to be set. FIG. 5 illustrates the throughput rate, which is 250 t/h, a fuel consumption of 1.5 l/t harvested crop, an expected harvesting time of 9 hours, and a gradation of the quality of the harvested crop, which is displayed here as a mark between 3 and 4. It would be conceivable to highlight changes compared to the current values (field 206) by means of the colour (green for better, red for worse) and/or arrows. Furthermore, the operating parameters calculated on the basis of the position of the cursor 212 could also be displayed on the right next to the field 202, but this has not been shown in FIG. 5 for the sake of clarity. A field 222 shows that in field 220 the values are shown which are expected if the type of optimization which is selected with the cursor 212 is selected and serves to determine the operating parameters.

The operator can therefore try out different settings of the cursor 212 within the body 210 and determine in what way the selected optimization acts on the values for the working result. The operator can therefore very easily determine which position of the cursor 212, and therefore which optimization, appears most appropriate to him. The operator also learns the relationships between the type of optimization and the expected values for the working result, with the result that a learning effect for inexperienced, and even for experienced, operators occurs, in particular at the start of a harvesting season. The operator can, if appropriate, also compare a setting which has been predefined by a client with an optimized setting and propose to the client that the predefinition or setting be changed. For this purpose, the operator can show the operator assistance system 64 to the client in situ, or can transmit the contents of the display device 66 to the client via the third communication interface 74. Furthermore, it would also be conceivable that the optimization which is to be used is already predefined with the order (cf. step 104) and cannot be changed by the operator. In this case, if appropriate only an operator with corresponding authorization would be able to overwrite the predefined optimization.

The processor 68 then outputs the calculated operating parameters (field 202), in particular in response to a confirmation input by the operator, so that the operator can set said operating parameters at the machine 10, or the processor uses the second communication interface 62 and the first communication interface 58 to make the control unit 42 set the calculated operating parameters automatically.

The step 118 can be repeated during the harvesting, either in response to an operator input or if the processor 68 determines that one or more of the values of the working result (cf. field 206) is currently worse, by more than a predefinable or predefined threshold value, than a value which can be achieved given suitable optimization (i.e. the position of the cursor 212) should be. The operator is provided in this case with a corresponding warning message and the window according to FIG. 5 opens.

The processor 68 is supported by a large amount of data in making the calculations for the step 118, i.e. the determination of optimized operating parameters and associated values for the working result on the basis of the position of the cursor 212. On the basis of the order (step 104), the processor is provided with information relating to the position of the field and of the crop (type of plant, type of soil, weather data of the growth period this year, best-in-class information, yield data and associated machine settings during previous harvests, in particular including associated historic weather information, empirical reports, expert knowledge) which the processor can obtain from the computer 78 or from some other suitable source, for example via the Internet. The expected throughput rates and harvested crop moisture levels are thus already known even though they can still be updated or corrected during the harvesting by means of the sensor 38 (which can be embodied as a close-range infrared sensor in order to determine the harvested crop moisture level) and a sensor (not shown) for detecting the gap between the upper and lower pre-pressing rollers or some other sensor which detects the throughput rate. The cutting height of the harvesting attachment 20 is also taken into account since it influences the throughput rate through the machine 10. The cutting height can be predefined by the order (step 104) or can be controlled by the operator or is only defined during the harvesting on the basis of a proportion of soiling in the harvested crop (for example particles of soil adhering to the plants) detected with the sensor 38.

During the evaluation of the quality, the purpose of use of the harvested crop is taken into account, which use can already be contained in the order (step 104) or can be input by the operator. It is therefore possible in the case of the use as feed for animals, that the opening of grains by the harvested crop post-processing device 28, in order to utilize their energy content, is particularly important for the quality. Given use in a biogas system, the avoidance of excessively long cutting lengths may tend to influence the quality. The importance of various parameters for the quality could also be displayed by sliding controllers 224 on the display device 66 and set by means of the input device 72, which may be embodied, in particular, as a touch-sensitive display device 66. The upper sliding controller could therefore represent the importance of the opening of the grains and the lower sliding controller could represent the avoidance of excessively large cutting lengths.

If it is also to be possible to optimize a further result parameter of the working process, such as for example the generation of noise during the harvesting process, the body 210 could also be embodied as a rectangle. The fourth corner is then assigned to the fourth result parameter of the working process.

Finally, the processor 68 is also provided with data relating to the type of machine 10, in particular relating to the number of blades distributed around the circumference of the chopper device 22, the type and the width of the harvesting attachment 20 and, preferably, also details of the characteristic curves of the internal combustion engine 50, said number of blades being required for the control of the cutting length and for the calculation of the energy requirement of the chopper device 22. In addition, an upper and/or a lower limit of the cutting length can be predefined.

During the optimization of the operating parameters as a function of the selected working result which is to be optimized, the processor 68 uses a database which is based on empirical values, previous or simultaneously occurring trials and harvesting processes (which have been carried out with the same machine 10 and/or other machines and with the current operator and/or other operators) and expert knowledge. In each case the energy requirement of the chopper device 22, of the pre-pressing rollers 30, 32, of the harvesting attachment 20 (if appropriate driven at a speed which is dependent on the propulsion speed V and/or the cutting length and/or the throughput rate) and of the harvested crop post-processing device 28 is respectively taken into account, and nevertheless efforts are made to achieve usable values for the quality even if optimization of the efficiency and/or productivity is selected. The influence of the cutting length on the grains is also taken into account because in the case of relatively short cutting lengths more grains will already be cut into (and therefore do not need to be opened by the harvested crop post-processing device 28) than in the case of relatively large cutting lengths.

If pure optimization of the efficiency is selected, the processor 68 will actuate on the characteristic curve of the internal combustion engine 50 a working point of said internal combustion engine 50 which is as favourable as possible in terms of consumption, and will derive the remaining operating parameters therefrom, while maintaining acceptable quality. Analogously, the processor 68 will, if pure optimization of the productivity is selected, set the working point of the internal combustion engine 50 to maximum performance and derive the remaining operating parameters therefrom while maintaining acceptable quality. Given optimization of the quality, the processor 68 will predominantly optimize the cutting length and the harvested crop processing device 28 and derive the other operating parameters therefrom. If now a result parameter is selected which comprises one or more of the possible result parameters to a weighted degree, i.e. the cursor 212 is placed at a point on the body 210 which does not correspond to one of the corners, the processor 68 will calculate the operating parameters as a function of the relative weighting of the respective result parameters by permitting greater deviations from an operating parameter which occurs in the case of a pure selection of a single result parameter the smaller the weighting of the respective result parameter.

It is also to be noted that in the illustration according to FIG. 5 some text or all of the text could be replaced by symbols.

In the step 120 which follows step 118 the actual harvesting process is then carried out.

The invention claimed is:

1. An operator assistance system for an agricultural machine having at least one variable operating parameter which influences a plurality of different result parameters of a working result of the machine, the operator assistance system comprising:
   an input device;
   a processor connected to the input device; and
   a display device connected to the processor, the display device having a current field and an expected field, the current field including a current operation value for the at least one operating parameter and a current value for a working result of the machine for the operation;
   wherein the processor is programmed to display a polygonal body on the display device, each corner of the polygonal body is associated with a result parameter, and a cursor serving to select the result parameter can be moved over the polygonal body with the input device, and the processor calculates an optimized operating parameter on the basis of the position of the cursor in relation to the distance from each corner, and to output, on the expected field of the display device, at least one expected value, associated with the optimized operating parameter, for the working result of the machine for the operation, and at least one expected operation value for the optimized operating parameter; and wherein the processor is connected to a least one sensor and at least one control unit through an interface and a bus, the processor receiving an environmental data from the sensor and transmitting signal to the control unit controlling an engine or at least one hydraulic motor.

2. The operator assistance system of claim 1, wherein the input device permits an input of one or more of the following result parameters: (a) maximum efficiency of the operation, (b) maximum productivity of the operation and (c) maximum quality of the working result.

3. The operator assistance system of claim 1, wherein one or more of the following values for the working result of the machine for the operation can be displayed on the display device: throughput rate of harvested crop, fuel consumption, working time and a measure of the quality of the harvested crop.

4. The operator assistance system of claim 1, wherein the input device permits a selection of a relative weighting of the possible result parameters.

5. The operator assistance system of claim 4, wherein the processor is programmed to calculate, for a selected result parameter which comprises a plurality of the possible result parameters in a weighted measure, the operating parameter as a function of the relative weighting of the respective result parameters, in that it permits greater deviations from an operating parameter which results in the case of a pure selection of a single result parameter, the smaller the weighting of the respective result parameter.

6. The operator assistance system of claim 1, wherein the agricultural machine is a field chopper which has an internal combustion engine, a harvesting attachment which has a drive connection to the internal combustion engine, a harvested crop feed device which is arranged downstream of the harvested crop collecting device, has a drive connection to the internal combustion engine and has pre-pressing rollers, a chopper device which is arranged downstream of the harvested crop feed device and has a drive connection to the internal combustion engine, a harvested crop post-processing device which is arranged downstream of the chopper device and has a drive connection to the internal combustion engine and a transfer device, arranged downstream of the harvested crop post-processing device, for chopped harvested crop, and wherein the processor is programmed to optimize one or more of the following operating parameters: the rotational speed of the internal combustion engine, the propulsion speed of the machine, the cutting length of the harvested crop and a degree of action of the harvested crop post-processing device.

7. The operator assistance system of claim 1, wherein the processor is supplied with information relating to one or more of the following variables and is programmed to take into account the variables during the optimization of the operating parameter and of the expected value for the working result: moisture content of harvested material to be collected, crop density of a field which is to be harvested and has a crop, type of plants of the field to be harvested, intended use of the crop, type of harvesting attachment, cutting height of the harvesting attachment, number of blades of a chopper drum, a predefinable lower limit of the cutting length, a predefinable upper limit of the cutting length, weather history and any types of linear or non-linear relationships, which are theoretical or based on empirical values between the aforementioned variables and the resulting operating parameter and/or the expected value for the working result, such as empirical reports, expert knowledge or best-in-class information.

8. The operator assistance system of claim 1, wherein the operator assistance system is implemented physically on a portable hand-held device which can be disconnected from the machine and connected to call the bus of the machine.

9. The operator assistance system of claim 1, wherein the agricultural machine is a field chopper.

10. The operator assistance system of claim 1, wherein the current field includes a current operating parameter field displaying the at least one current value for the at least one operating parameter and a current working result field displaying the at least one current value for the working result, and the expected field includes an expected operating parameter field displaying the at least one expected value for optimized operating parameter and an expected working result field displaying the expected value for the working result.

11. An agricultural machine having an operator assistance system, comprising:
an input device;
a processor connected to the input device; and
a display device connected to the processor, the display device having a current field and an expected field, the current field including a current operation value for a current operating parameter and a current value for a working result of the machine for the operation;
the processor is programmed to receive, via the input device an input of a selectable result parameter, to be optimized, of the working result for an operation to be carried out, to calculate an optimized operating parameter on the basis of the input of the selectable result parameter, and to output, on the expected field of the display device, at least one expected value, associated with the optimized operating parameter, for the working result of the machine for the operation, and at least one expected operation value for the optimized operating parameter; and
wherein the processor is programmed to display a polygonal body on the display device, each corner of the polygonal body is associated with a result parameter, a cursor serving to select the result parameter can be moved over the polygonal body with the input device, and the processor calculates the optimized operating parameter on the basis of the position of the cursor in relation to the distance from each corner of the polygonal body.

12. The agricultural machine of claim 11, wherein the input device permits an input of one or more of the following result parameters: (a) maximum efficiency of the operation, (b) maximum productivity of the operation and (c) maximum quality of the working result.

13. The agricultural machine of claim 11, wherein one or more of the following values for the working result of the machine for the operation can be displayed on the display device: throughput rate of harvested crop, fuel consumption, working time and a measure of the quality of the harvested crop.

14. The agricultural machine of claim 11, wherein the input device permits a selection of a relative weighting of the possible result parameters.

15. The agricultural machine of claim 14, wherein the processor is programmed to calculate, for a selected result parameter which comprises a plurality of the possible result parameters in a weighted measure, the operating parameter as a function of the relative weighting of the respective result parameters, in that it permits greater deviations from an operating parameter which results in the case of a pure selection of a single result parameter, the smaller the weighting of the respective result parameter.

16. The agricultural machine of claim 11, wherein the agricultural machine is a field chopper which has an internal combustion engine, a harvesting attachment which has a drive connection to the internal combustion engine, a harvested crop feed device which is arranged downstream of the harvested crop collecting device, has a drive connection to the internal combustion engine and has pre-pressing rollers, a chopper device which is arranged downstream of the harvested crop feed device and has a drive connection to the internal combustion engine, a harvested crop post-processing device which is arranged downstream of the chopper device and has a drive connection to the internal combustion engine and a transfer device, arranged downstream of the harvested crop post-processing device, for chopped harvested crop, and wherein the processor is programmed to optimize one or more of the following operating parameters: the rotational speed of the internal combustion engine, the propulsion speed of the machine, the cutting length of the harvested crop and a degree of action of the harvested crop post-processing device.

17. The agricultural machine of claim 11, wherein the processor is supplied with information relating to one or more of the following variables and is programmed to take into account the variables during the optimization of the operating parameter and of the expected value for the working result: moisture content of harvested material to be collected, crop density of a field which is to be harvested and has a crop, type of plants of the field to be harvested, intended use of the crop, type of harvesting attachment, cutting height of the harvesting attachment, number of blades of a chopper drum, a predefinable lower limit of the cutting length, a predefinable upper limit of the cutting length, weather history and any types of linear or non-linear relationships, which are theoretical or based on empirical values between the aforementioned variables and the resulting operating parameter and/or the expected value for the working result, such as empirical reports, expert knowledge or best-in-class information.

18. The agricultural machine of claim 11, wherein the operator assistance system is implemented physically on a portable hand-held device which can be disconnected from the machine and connected to a bus system of the machine.

19. The agricultural machine of claim 11, wherein the agricultural machine is a field chopper.

20. The agricultural machine of claim 11, wherein the current field includes a current operating parameter field displaying the at least one current value for the at least one operating parameter and a current working result field displaying the at least one current value for the working result, and the expected field includes an expected operating parameter field displaying the at least one expected value for optimized operating parameter and an expected working result field displaying the expected value for the working result.

* * * * *